United States Patent
Aleksandrowicz et al.

(10) Patent No.: US 9,697,276 B2
(45) Date of Patent: Jul. 4, 2017

(54) LARGE TAXONOMY CATEGORIZATION

(71) Applicant: International Business Machines Corporation, Armonk, NY (US)

(72) Inventors: Gadi Aleksandrowicz, Haifa (IL); Doron Cohen, Mitzpe Gilon (IL); David Konopnicki, Haifa (IL); Oded Margalit, Ramat Gan (IL); Haggai Roitman, Yokneam Elit (IL); Dafna Sheinwald, Nofit (IL); Michal Shmueli-Scheuer, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/583,791

(22) Filed: Dec. 29, 2014

(65) Prior Publication Data
US 2017/0032018 A1    Feb. 2, 2017

(51) Int. Cl.
*G06F 17/30*    (2006.01)

(52) U.S. Cl.
CPC .... *G06F 17/30598* (2013.01); *G06F 17/3053* (2013.01); *G06F 17/30327* (2013.01)

(58) Field of Classification Search
CPC ......... G06F 17/30734; G06F 17/30705; G06F 17/30625; G06F 17/3053; G06F 17/30327; G06F 17/30598; G06F 17/2241; G06F 17/30424
USPC ....................................................... 707/740
See application file for complete search history.

(56) References Cited

U.S. PATENT DOCUMENTS

| 7,546,278 | B2 | 6/2009 | Yang et al. | |
|---|---|---|---|---|
| 8,065,731 | B1 * | 11/2011 | Nucci | G06F 21/568 713/187 |
| 8,356,035 | B1 * | 1/2013 | Baluja | G06F 17/30247 707/741 |
| 8,620,922 | B2 * | 12/2013 | Bird | G06F 17/30737 707/740 |
| 8,650,171 | B2 | 2/2014 | Sacco | |

(Continued)

OTHER PUBLICATIONS

Mike Chen., "Taxonomic Relation Extraction from Wikipedia: Datasets and Algorithms", School of Electrical Engineering and Computer Science, Ohio University Athens, OH 43201, pp. 1-9, 2011.

(Continued)

*Primary Examiner* — Thanh-Ha Dang
(74) *Attorney, Agent, or Firm* — Daniel Kligler (57) ABSTRACT

A method includes associating, in a graph including graph nodes connected via of edges, a respective node weight with each of the graph nodes, and organizing the graph nodes into ancestor nodes, each of the ancestor nodes having one or more descendent nodes so that the ancestor and the descendent nodes include all the graph nodes. For a given descendent node, a respective path to one or more of the ancestor nodes is identified, each of the respective paths including one or more edges, and a given ancestor node having a shortest of the identified paths is determined. A respective edge weight is assigned to each of the one or more edges in the shortest path, and, for the given descendent node, a node loss value is calculated based on the node weight and the respective edge weight of the each of the one or more edges.

13 Claims, 4 Drawing Sheets

(56) References Cited

U.S. PATENT DOCUMENTS

| | | | |
|---|---|---|---|
| 2009/0067719 A1* | 3/2009 | Sridhar | G06F 17/2775 |
| | | | 382/176 |
| 2009/0235285 A1* | 9/2009 | Kim | G06F 17/30961 |
| | | | 719/328 |
| 2009/0327424 A1* | 12/2009 | Bernstein | G06Q 10/06 |
| | | | 709/205 |
| 2010/0057699 A1* | 3/2010 | Sridhar | G06F 17/30781 |
| | | | 707/E17.014 |
| 2010/0161527 A1 | 6/2010 | Sellamanickam et al. | |
| 2011/0035378 A1 | 2/2011 | Scholz et al. | |
| 2011/0307436 A1* | 12/2011 | Cai | G06F 17/30864 |
| | | | 706/48 |
| 2012/0246296 A1* | 9/2012 | Seifert | G06F 17/30899 |
| | | | 709/224 |
| 2013/0014136 A1* | 1/2013 | Bhatia | H04N 21/252 |
| | | | 725/9 |
| 2013/0290303 A1 | 10/2013 | Harinarayan et al. | |
| 2013/0326427 A1* | 12/2013 | Elias | G06F 9/4443 |
| | | | 715/854 |
| 2014/0067535 A1 | 3/2014 | Rezaei et al. | |
| 2014/0082022 A1* | 3/2014 | Lamba | G06F 17/30958 |
| | | | 707/777 |
| 2014/0108285 A1* | 4/2014 | Varadarajan | G06Q 50/20 |
| | | | 705/326 |
| 2014/0122360 A1* | 5/2014 | Rao | G06Q 10/105 |
| | | | 705/321 |
| 2014/0136468 A1* | 5/2014 | Faratin | G06F 17/30625 |
| | | | 706/55 |
| 2015/0142767 A1* | 5/2015 | Wu | G06F 17/30864 |
| | | | 707/706 |
| 2015/0220566 A1* | 8/2015 | Cumming | G06F 17/30241 |
| | | | 707/711 |
| 2015/0293989 A1* | 10/2015 | Bhargava | G06F 17/30598 |
| | | | 707/737 |
| 2016/0117413 A1* | 4/2016 | Botea | G06F 17/30587 |
| | | | 707/749 |
| 2016/0179945 A1* | 6/2016 | Lastra Diaz | G06F 17/30734 |
| | | | 707/739 |

OTHER PUBLICATIONS

Or Biran., "Classifying Taxonomic Relations between Pairs of Wikipedia Articles", 2013, Can be found at: http://www.cs.columbia.edu/nlp/papers/2013/taxonomy_ijcnlp_2013.pdf.

Xiaoxin Yin., "Building Taxonomy of Web Search Intents for Name Entity Queries", 2010, Can be found at: http://research.microsoft.com/pubs/120889/fp0700-yin.pdf.

Bill Kules et al., "Categorizing Web Search Results into Meaningful and Stable Categories Using Fast-Feature Techniques", Digital Libraries, 2006. JCDL '06. Proceedings of the 6th ACM/IEEE-CS Joint Conference on Jun. 2006, pp. 210-219.

* cited by examiner

LARGE TAXONOMY CATEGORIZATION

FIELD OF THE INVENTION

The present invention relates generally to taxonomies and specifically to selecting meaningful categories from large-scale taxonomies.

BACKGROUND

Taxonomies can organize a set of concepts (or categories) by classifying well-defined underlying relationships between the different concepts. Examples of large taxonomies include the Open Directory Project (which may be found at www.dmoz.org) that contains categories which describe web page (i.e., URL) topics, and the category graph associated with Wikipedia documents (which may be found at www.wikipedia.org). The Open Directory Project (ODP) and Wikipedia have different graph topologies. The ODP's hierarchical taxonomy comprises a tree graph of around 600,000 nodes (i.e., categories), while Wikipedia's taxonomy comprises a directed graph containing approximately 900,000 nodes.

The description above is presented as a general overview of related art in this field and should not be construed as an admission that any of the information it contains constitutes prior art against the present patent application.

SUMMARY

There is provided, in accordance with an embodiment of the present invention a method, including associating, in a graph including a first plurality of graph nodes connected via a second plurality of edges, a respective node weight with each of the graph nodes, organizing the graph nodes into multiple ancestor nodes, each of the ancestor nodes having one or more descendent nodes so that the ancestor and the descendent nodes include all the graph nodes, identifying, for a given descendent node, a respective path to one or more of the ancestor nodes, each of the respective paths including one or more edges, determining a given ancestor node having a shortest path, to the given descendant node, of the respective paths, assigning a respective edge weight to each of the one or more edges in the shortest path, and calculating, for the given descendent node, a node loss value based on the node weight and the respective edge weight of the each of the one or more edges.

There is also provided, in accordance with an embodiment of the present invention an apparatus, including a memory configured to store a graph including a first plurality of graph nodes connected via a second plurality of edges, and a processor configured to associate a respective node weight with each of the graph nodes, to organize the graph nodes into multiple ancestor nodes, each of the ancestor nodes having one or more descendent nodes so that the ancestor and the descendent nodes include all the graph nodes, to identify, for a given descendent node, a respective path to one or more of the ancestor nodes, each of the respective paths including one or more edges, to determine a given ancestor node having a shortest path, to the given descendant node, of the respective paths, to assign a respective edge weight to each of the one or more edges in the shortest path, and to calculate, for the given descendent node, a node loss value based on the node weight and the respective edge weight of the each of the one or more edges.

There is further provided, in accordance with an embodiment of the present invention a computer program product, the computer program product including a non-transitory computer readable storage medium having computer readable program code embodied therewith, the computer readable program code including computer readable program code configured to organize the graph nodes into multiple ancestor nodes, each of the ancestor nodes having one or more descendent nodes so that the ancestor and the descendent nodes include all the graph nodes, computer readable program code configured to identify, for a given descendent node, a respective path to one or more of the ancestor nodes, each of the respective paths including one or more edges, computer readable program code configured to determine a given ancestor node having a shortest path, to the given descendant node, of the respective paths, computer readable program code configured to assign a respective edge weight to each of the one or more edges in the shortest path, and computer readable program code configured to calculate, for the given descendent node, a node loss value based on the node weight and the respective edge weight of the each of the one or more edges.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Graph data structures can be used to summarize and describe taxonomies such as sets of documents, and sets of users. In a given graph data structure, each node can also have an associated weight to capture the importance of its category within the corpus. For example, a given weight can capture the popularity of its associated category.

Embodiments of the present invention provide methods and systems for categorizing a graph (e.g., a tree graph or a directed graph) configured to represent a large taxonomy. In embodiments described herein, the graph comprises a first plurality of graph nodes connected via a second plurality of edges, and each of the graph nodes has a respective node weight. For example, if the graph nodes comprise World Wide Web addresses (also referred to herein simply as web addresses) for each entry in the Open Directory Project (ODP), a given weight may comprise a number of visitors to the respective ODP web address. As described hereinbelow, categorizing the graph comprises selecting a set of a specified number of ODP entries that "best represent" an entire collection of users and documents using the ODP taxonomy by identifying the set of ODP entries that have the lowest specificity loss.

In some embodiments, the graph nodes of the graph are organized (i.e., segmented) into multiple ancestor nodes, wherein each of the ancestor nodes has one or more descendent nodes so that the ancestor and the descendent nodes include all the graph nodes. The graph can be either a tree graph having a root node or a directed graph having a major ancestor node, and including all the multiple graph nodes comprises including (i.e., covering by the ancestor nodes) all of the graph nodes below the root node or the major ancestor node. In embodiments of the present invention, each of the descendent nodes has a respective node loss value, and the specificity loss for a given plurality of ancestor nodes having multiple descendent nodes comprises a sum of all the node loss values for the multiple descendent nodes.

To calculate a node loss value for a given descendent node, a respective path comprising one or more edges is identified to one or more of the ancestor nodes, a given ancestor node having a shortest path (i.e., of the respective paths, as described hereinbelow) to the given descendant node is determined, a respective edge weight is assigned to each of the one or more edges in the shortest path, and a node loss value is calculated based on the node weight and the respective edge weight of the each of the one or more edges. Examples of edge weights are described hereinbelow.

System Description

Figure 1:
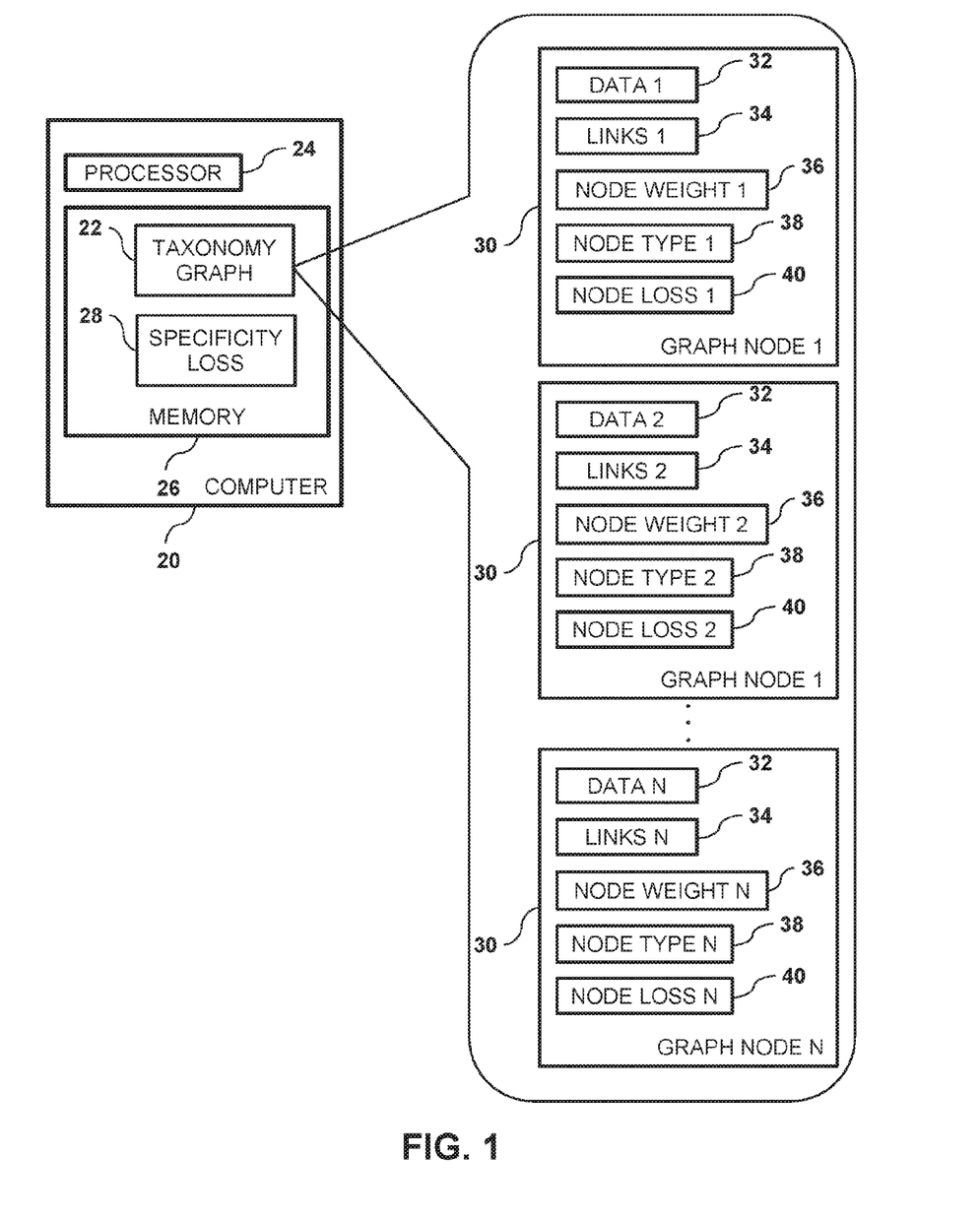
FIG. 1 is a block diagram of a computer system configured to analyze a taxonomy graph, in accordance with an embodiment of the present invention.

FIG. 1 is a block diagram of a computer 20 configured to categorize a taxonomy graph 22, in accordance with an embodiment of the present invention. Computer 20 comprises a processor 24 and a memory 26 that stores taxonomy graph 22 and a specificity loss 28. Taxonomy graph 22 comprises multiple nodes 30. Each node 30 comprises node data 32, links 34, a node weight 36, a node type 38 and a node loss value 40.

For example, if a given node 30 comprises a Wikipedia web address, then data 32 comprises information stored at the web address, links 34 comprise one or more web addresses (e.g., to additional Wikipedia entries), and node weight 36 comprises a number of visitors to the Wikipedia entry referenced by the web address associated with the given node. In embodiments of the present invention, node type 38 indicates if the given node is an ancestor node or a descendent node, and node loss value 40 comprises the node loss value for the given node. In alternative embodiments node type 38 and node loss value 40 may be stored in a separate data structure. Calculating the node loss value is described in the description referencing FIG. 4 hereinbelow.

Processor 24 typically comprises a general-purpose computer, which is programmed in software to carry out the functions described herein. The software may be downloaded to computer 20 in electronic form, over a network, for example, or it may be provided on non-transitory tangible media, such as optical, magnetic or electronic memory media. Alternatively, some or all of the functions of processor 24 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Taxonomy Categorization

Figure 2:
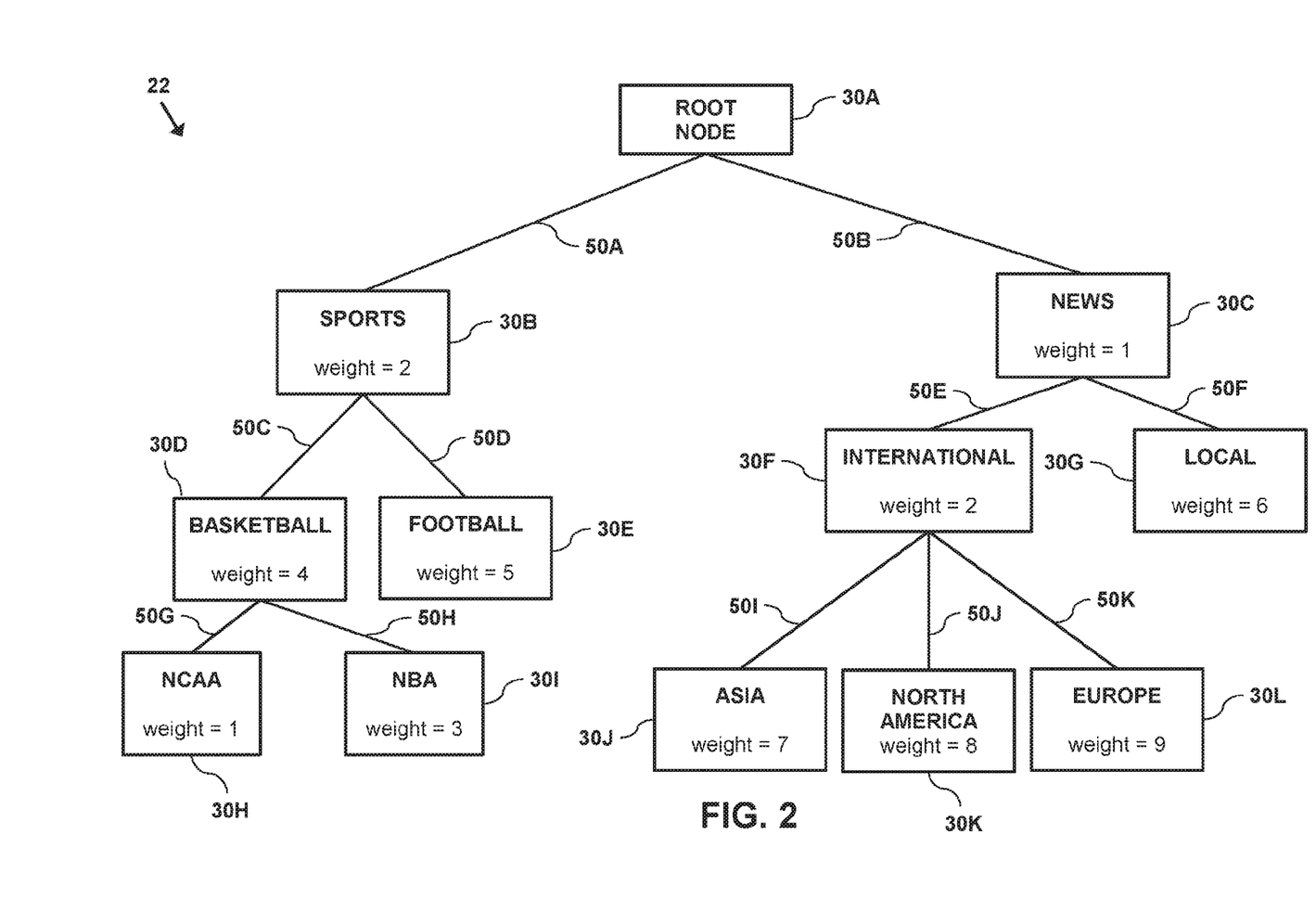
FIG. 2 is a tree graph showing an example of the taxonomy graph, in accordance an embodiment of the present invention.

FIG. 2 is an example of a taxonomy graph 22 organized as a tree graph data structure. Graph 22 comprises nodes 30 connected by edges 50. In the example shown in FIG. 2, nodes 30 and edges 50 can be differentiated by appending a letter to the identifying numeral, so that the nodes comprise nodes 30A-30L and the edges comprise edges 50A-50L. While the example in FIG. 2 shows taxonomy graph 22 comprising a tree graph having root node 30A, the taxonomy may comprise a directed graph, and node 30A comprises a major ancestor node (e.g., "Current Events") for the directed graph.

Figure 3:
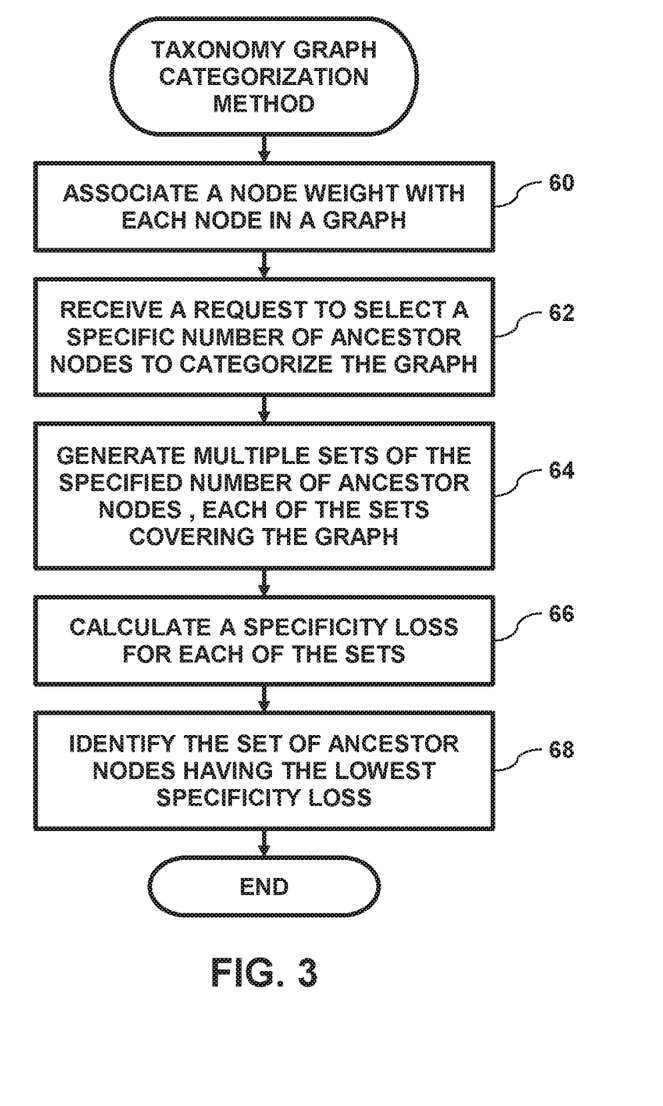
FIG. 3 is a flow diagram that schematically illustrates a method of categorizing the taxonomy graph, in accordance an embodiment of the present invention.

FIG. 3 is a flow diagram that schematically illustrates a method of categorizing taxonomy graph 22 by selecting a specific number of nodes 30 that best represent (i.e., categorize) the taxonomy graph, in accordance with an embodiment of the present invention. In an association step 60, processor 24 associates (i.e., stores) a weight value to each node weight 36 in graph 22.

In a receive step 62, processor 24 receives a request to select a specific number of graph nodes 30 that cover taxonomy graph 22 in order to best represent the taxonomy graph, and in a generate step 64, processor 24 generates multiple sets of graph nodes 30 that are referred to herein as ancestor nodes. Some of the sets of graph nodes 30 may include root node 30A.

In a calculation step 66, processor 24 calculates a specificity loss for each of the generated sets. Calculating the specificity loss for a given set is described in the description referencing FIG. 4 hereinbelow.

Finally, in an identification step 68, processor 24 identifies the set of ancestor nodes having the lowest specificity loss and the method ends. In embodiments of the present invention, the set of ancestor nodes having the lowest specificity loss comprises the ancestor nodes that best categorize/represent taxonomy graph 22.

Figure 4:
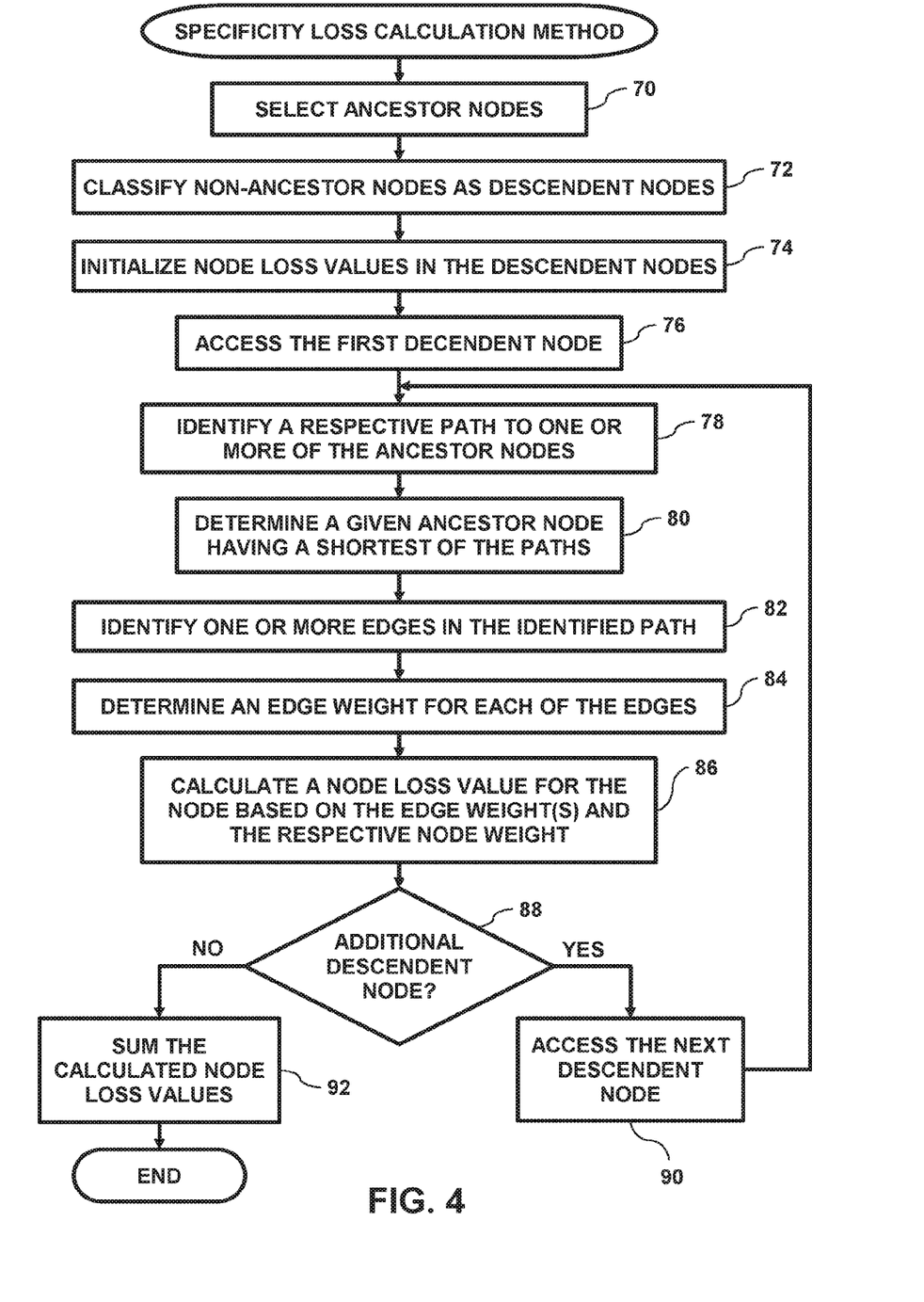
FIG. 4 is a flow diagram that schematically illustrates a method of calculating a specificity loss for a set of multiple ancestor nodes in the taxonomy graph, in accordance an embodiment of the present invention.

FIG. 4 is a flow diagram that schematically illustrates a method of calculating a specificity loss for a set of multiple ancestor nodes 30, in accordance with an embodiment of the present invention. In a select step 70, processor 24 selects the set of multiple ancestor nodes 30 that cover taxonomy graph 22, and in a classification step 72, the processor classifies any nodes 30 not in the selected set (excluding root node 30A) as descendent nodes 30.

In an initialization step 74, the processor initializes node loss 40 in each graph node 30 (e.g., to zero), and in a first access step 76, the processor accesses the first ancestor node in the set. Processor 24 then identifies a respective path to one or more of the ancestor nodes in a first identification step 78, determines a given ancestor node having a shortest of the paths in a first determination step 80, and in a second identification step 82, identifies one or more edges 50 in the identified shortest path. In some embodiments, the shortest of paths comprises a given path having the fewest edges 50. By identifying the shortest path, embodiments of the present invention ensure that each of the descendent nodes is associated with its "closest" ancestor nodes.

For example, in the taxonomy graph shown in FIG. 2, if the ancestor nodes comprise graph nodes 30B, 30C and 30D, and the accessed descendent node comprises node 30I, then:

Processor 24 identifies a first path to graph node 30D comprising edge 50H.

Processor 24 identifies a second path to graph node 30B comprising edges 50H and 50C.

Processor 24 identifies the first path as the shortest path, thereby associating descendent node 30I with ancestor node 30D.

In some embodiments, there will only be a single path between the given descendent node and any of the ancestor nodes, and therefore the shortest path comprises the single path. For example, if the ancestor nodes comprise graph nodes 30B, 30C and 30D, and the accessed descendent node comprises node 30L, then the only path to a given ancestor node 30 comprises edges 50K and 50E, thereby associated with ancestor node 30C.

In a first determination step 84, processor 24 determines a respective edge weight for each of the identified edges in the shortest path, and in a calculation step 86, the processor calculates a node loss value using the one or more edge weights in the identified shortest path and node weight 36 stored in the given descendent node. The node loss value represents a data loss that is measured by the node weight of the given descendent node and the proximity of the relationship between the given descendent node and its associated ancestor node 30.

In embodiments of the present invention, processor 24 can calculate a given node weight 36 for a given descendent node 30 based on the descendent node's depth in taxonomy graph 22. As described hereinbelow, the depth can be relative to the given descendent node's associated ancestor node 30 (i.e., the number of edges 50 between the given descendent node and the associated ancestor node). Alternatively, in embodiments where taxonomy graph 22 comprises a tree graph, the depth can be relative to the root node of the tree graph (i.e. the number of edges 50 between the given descendent node and the root node), and in embodiments where the taxonomy graph comprises a directed graph, the depth can be relative to a given major ancestor node 30 in the directed graph (i.e. the number of edges 50 between the given descendent node and the given major ancestor node).

In a first embodiment, processor 24 can assign each of the edges an edge weight of "1" (i.e., all the edge weights are the same), and for a given node 30 having a descendent node type, processor 24 can use the following formula to calculate node loss value 40:

Node Loss=(Number of Edges)*(Node Weight)

where (Number of Edges) comprises a number of edges 50 between the given node 30 and its associated ancestor node 30, and (Node Weight) comprises node weight 36 for the given (i.e., descendent) node 30.

For example, if the ancestor nodes comprise graph nodes 30B, 30C and 30D in the taxonomy graph shown in FIG. 2, the node loss values are as follows:

Node 30E: 5*1=5.
Node 30H: 1*1=1.
Node 30I: 3*1=3.
Node 30F: 2*1=2.
Node 30G: 6*1=6.
Node 30J: 7*2=14.
Node 30K: 8*2=16.
Node 30L: 9*2=18.

In a second embodiment, processor 24 can assign a given edge 50 with a respective weight that is inversely related to a depth of the given edge in the taxonomy graph. Specifically, if the taxonomy graph comprises a tree graph, processor 24 can assign the weight to be 1=depth, whereas for general taxonomy graphs the respective weight can be a reciprocal of a distance (i.e., number of edges) of a given descendent node 30 from a major ancestor node 30 (e.g., "Wikipedia categories" in Wikipedia, which is an ancestor of the vast majority of all categories). Thus, edges 50 that are closer to the root node (or a given major ancestor node) of the taxonomy graph can become "heavier" than the edges further from the given descendent node, and consequently less likely have documents in their front endpoint migrate to and merge into their back endpoint.

In a third embodiment, processor 24 can assign a given edge 50 with a respective weight based on a semantic similarity between the graph nodes at each end of the given edge. To determine the semantic similarity processor 24 can use an approach that captures similarity based on the node name (i.e., in data 32) buy using a mutual information (MI) approach, in which, for example, a distance (weight) between a given node 30 for "NCAA Football Series" (not shown) and its child node "NCAA Football 2000" (not shown) is low (0:29), whereas, a distance between nodes 30B and 30E is 0:8. The 0:29 distance implies a small distance between the nodes, and thus by merging child's documents into parent, the loss is lower compared to the second example.

Returning to the flow diagram in FIG. 4, in a decision step 88, if there are additional descendent nodes 30, then processor 24 accesses the next descendent node 30 in a second access step 90. If there are no additional descendent nodes 30, then processor 24 calculates specificity loss 28 for the set of ancestor nodes 30 by summing all node loss values 40 for all the descendent nodes 30 (i.e., for the set of ancestor nodes) in taxonomy tree 22.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:

providing a graph comprising a first plurality of graph nodes connected via a second plurality of edges, each of the graph nodes corresponding to a respective one of multiple World Wide Web addresses;

associating a respective node weight with each of the graph nodes, wherein the respective weight of a given graph node comprises a number of visitors to the respective World Wide Web address;

organizing the graph nodes into multiple sets of ancestor nodes and remaining descendant nodes, each of the ancestor nodes having one or more descendent nodes so that, in each of the sets, the ancestor and the descendent nodes include all the graph nodes;

initializing a respective ancestor loss value for each of the ancestor nodes;

for a plurality of the descendent nodes in several of the sets:
  identifying, for a given descendent node, a respective path to one or more of the ancestor nodes, each of the respective paths comprising one or more edges,
  determining a given ancestor node having a shortest path, to the given descendent node, of the respective paths,
  assigning a respective edge weight to each of the one or more edges in the shortest path, and
  calculating, for the given descendent node, a node loss value based on the node weight and the respective edge weight of the each of the one or more edges, and
  adding the calculated descendent node loss value to the respective ancestor node loss value;

computing, for each of the sets, a sum of the computed node loss values of the respective descendent nodes; and selecting a specified number of the World Wide Web addresses as categorizing the World Wide Web addresses of the received graph, responsive to the computed sums of the node loss values of the sets of the nodes of the graph.

2. The method according to claim 1, wherein the graph is selected from a list consisting of a tree graph having a given graph node configured as a root node and a directed graph having a given graph node configured as a major ancestor node.

3. The method according to claim 2, wherein each of the one or more edge weights is based on its respective depth relative to the root node.

4. The method according to claim 2, wherein each of the one or more edge weights is based on its respective depth relative to the major ancestor node.

5. The method according to claim 2, wherein each of the one or more edge weights is based on its respective depth relative to the given ancestor node.

6. The method according to claim 1, wherein selecting the specified number of the World Wide Web addresses as categorizing the World Wide Web addresses of the received graph, responsive to the computed sums of the node loss values, comprises selecting the set having the lowest computed sum.

7. An apparatus, comprising:
a memory configured to store a graph comprising a first plurality of graph nodes connected via a second plurality of edges, each of the graph nodes corresponding to a respective one of multiple World Wide Web addresses; and
a processor configured:
to associate a respective node weight with each of the graph nodes, wherein the respective weight of a given graph node comprises a number of visitors to the respective World Wide Web address,
to organize the graph nodes into multiple sets of ancestor nodes and remaining descendant nodes, each of the ancestor nodes having one or more descendent nodes so that, in each of the sets, the ancestor and the descendent nodes include all the graph nodes,
to initialize a respective ancestor loss value for each of the ancestor nodes,
for a plurality of the descendent nodes in several of the sets:
to identify, for a given descendent node, a respective path to one or more of the ancestor nodes, each of the respective paths comprising one or more edges,
to determine a given ancestor node having a shortest path, to the given descendant node, of the respective paths,
to assign a respective edge weight to each of the one or more edges in the shortest path, and
to calculate, for the given descendent node, a node loss value based on the node weight and the respective edge weight of the each of the one or more edges, and
to add the calculated descendent node loss value to the respective ancestor node loss value,
to compute, for each of the sets, a sum of the computed node loss values of the respective descendent nodes; and
to select a specified number of the World Wide Web addresses as categorizing the World Wide Web addresses of the received graph, responsive to the computed sums of the node loss values of the sets of the nodes of the graph.

8. The apparatus according to claim 7, wherein the graph is selected from a list consisting of a tree graph having a given graph node configured as a root node and a directed graph having a given graph node configured as a major ancestor node.

9. The apparatus according to claim 8, wherein each of the one or more edge weights is based on its respective depth relative to the root node.

10. The apparatus according to claim 8, wherein each of the one or more edge weights is based on its respective depth relative to the major ancestor node.

11. The apparatus according to claim 8, wherein each of the one or more edge weights is based on its respective depth relative to the given ancestor node.

12. The apparatus according to claim 7, wherein the processor is configured to select the specified number of the World Wide Web addresses as categorizing the World Wide Web addresses of the received graph, responsive to the computed sums of the node loss values, by selecting the set having the lowest computed sum.

13. A computer program product, the computer program product comprising:
a non-transitory computer readable storage medium having computer readable program code embodied therewith, the computer readable program code comprising:
computer readable program code configured to provide a graph comprising a first plurality of graph nodes connected via a second plurality of edges, each of the graph nodes corresponding to a respective one of multiple World Wide Web addresses;
computer readable program code configured to associate a respective node weight with each of the graph nodes, wherein the respective weight of a given graph node comprises a number of visitors to the respective World Wide Web address;
computer readable program code configured to organize the graph nodes into multiple sets of ancestor nodes and remaining descendant nodes, each of the ancestor nodes having one or more descendent nodes so that, in each of the sets, the ancestor and the descendent nodes include all the graph nodes;
computer readable program code configured to initialize a respective ancestor loss value for each of the ancestor nodes;
for a plurality of the descendent nodes in several of the sets:
computer readable program code configured to identify, for a given descendent node, a respective path to one or more of the ancestor nodes, each of the respective paths comprising one or more edges,
to determine a given ancestor node having a shortest path, to the given descendant node, of the respective paths,
to assign a respective edge weight to each of the one or more edges in the shortest path, and
to calculate, for the given descendent node, a node loss value based on the node weight and the respective edge weight of the each of the one or more edges, and
to add the calculated descendent node loss value to the respective ancestor node loss value;
computer readable program code configured to compute, for each of the sets, a sum of the computed node loss values of the respective descendent nodes; and
computer readable program code configured to select a specified number of the World Wide Web addresses as categorizing the World Wide Web addresses of the received graph, responsive to the computed sums of the node loss values of the sets of the nodes of the graph.

* * * * *